United States Patent
David et al.

(10) Patent No.: US 10,704,474 B2
(45) Date of Patent: Jul. 7, 2020

(54) DEVICE FOR REDUCING THE COMBUSTION INSTABILITIES OF A COMBUSTION ENGINE

(71) Applicant: CONTINENTAL AUTOMOTIVE FRANCE S.A.S., Toulouse (FR)

(72) Inventors: Florent David, Suresnes (FR); Frederic Cousin, Saint Gratien (FR); Damien Fournigault, Pontoise (FR)

(73) Assignee: CONTINENTAL AUTOMOTIVE FRANCE S.A.S., Toulouse (FR)

( * ) Notice: Subject to any disclaimer, the term of this patent is extended or adjusted under 35 U.S.C. 154(b) by 212 days.

(21) Appl. No.: 15/747,831

(22) PCT Filed: Jul. 20, 2016

(86) PCT No.: PCT/FR2016/051868
§ 371 (c)(1),
(2) Date: Jan. 26, 2018

(87) PCT Pub. No.: WO2017/017349
PCT Pub. Date: Feb. 2, 2017

(65) Prior Publication Data
US 2018/0216546 A1    Aug. 2, 2018

(30) Foreign Application Priority Data

Jul. 27, 2015 (FR) .................................. 15 57166

(51) Int. Cl.
*F02D 41/00* (2006.01)
*F02D 41/12* (2006.01)
(Continued)

(52) U.S. Cl.
CPC ..... *F02D 41/0005* (2013.01); *F02D 41/0055* (2013.01); *F02D 41/0072* (2013.01);
(Continued)

(58) Field of Classification Search
CPC ... F02D 41/0005; F02D 41/0047–0057; F02D 41/0072; F02D 41/0077; F02D 41/12; F02D 41/123; F02M 26/06
See application file for complete search history.

(56) References Cited

U.S. PATENT DOCUMENTS

| 8,862,369 B2 | 10/2014 | Vitiello et al. |
| 2010/0179745 A1* | 7/2010 | Nakayama .......... F02D 41/0072 |
| | | 701/108 |

(Continued)

FOREIGN PATENT DOCUMENTS

| EP | 1 790 843 A1 | 5/2007 |
| FR | 3009020 A1 * | 1/2015 |

(Continued)

OTHER PUBLICATIONS

International Search Report, dated Sep. 20, 2016, from corresponding PCT/FR2016/051868 application.

*Primary Examiner* — Laert Dounis
(74) *Attorney, Agent, or Firm* — Young & Thompson (57) ABSTRACT

Disclosed is a device for reducing the combustion instabilities of a combustion engine, this device including: an intake circuit admitting oxidizing air to the engine, a valve positioned on the engine oxidizing air intake circuit and designed to regulate the flow rate of oxidant gas admitted to the engine, an exhaust gas recirculation circuit connected to the intake circuit upstream of the oxidizing air flow rate regulating valve. The device is arranged in such a way that, at least when an injection of fuel to the engine is cut off, a minimum opening of the valve is assured so as to eliminate recirculated gases from the intake circuit.

42 Claims, 2 Drawing Sheets

(51) Int. Cl.
F02M 26/06 (2016.01)
F02M 26/23 (2016.01)
F02D 11/10 (2006.01)
F02M 26/50 (2016.01)

(52) U.S. Cl.
CPC ....... F02D 41/0077 (2013.01); F02D 41/123 (2013.01); F02M 26/06 (2016.02); F02D 41/0062 (2013.01); F02D 2011/102 (2013.01); F02D 2041/0017 (2013.01); F02M 26/23 (2016.02); F02M 26/50 (2016.02); Y02T 10/42 (2013.01); Y02T 10/47 (2013.01)

(56) References Cited

U.S. PATENT DOCUMENTS

| | | | |
|---|---|---|---|
| 2010/0235074 A1* | 9/2010 | Shinagawa | F02D 41/126 701/108 |
| 2012/0303249 A1* | 11/2012 | Minami | F02D 41/0072 701/112 |
| 2014/0020664 A1* | 1/2014 | Yoshioka | F02B 33/00 123/559.1 |
| 2014/0100074 A1 | 4/2014 | Glugla | |

FOREIGN PATENT DOCUMENTS

| | | | | |
|---|---|---|---|---|
| JP | 2001 271673 A | | 10/2001 | |
| JP | 2011112012 A | * | 6/2011 | ............ F02D 23/00 |
| JP | 2012017708 A | * | 1/2012 | |
| JP | 2014139411 A | * | 7/2014 | |
| WO | 2008/149212 A1 | | 12/2008 | |
| WO | 2009/060287 A2 | | 5/2009 | |

* cited by examiner

DEVICE FOR REDUCING THE COMBUSTION INSTABILITIES OF A COMBUSTION ENGINE

The present invention relates to a device for reducing the combustion instabilities of a combustion engine, notably for a motor vehicle.

BACKGROUND OF THE INVENTION

The principle of recirculating a portion of the exhaust gases of a combustion engine at the intake is known, for example from patent U.S. Pat. No. 8,862,369. When applied to a supercharged spark-ignition engine, this technology can improve the efficiency of the engine, thereby reducing fuel consumption. Exhaust gas recirculation is commonly referred to using the abbreviation EGR. The EGR flow rate and the EGR ratio used by the engine are discussed below. In order to optimize operation of the engine, the quantity of exhaust gases recirculated is adapted to the operating conditions and is precisely controlled by an electric valve controlled by the electronic control unit of the engine of the vehicle. In steady-speed operation, the flow rate of recirculated exhaust gases can be approximately 20% of the total flow rate. Conversely, during idle phases, the EGR flow rate is usually zero, since the presence of EGR adversely affects combustion quality. The exhaust gases are usually recirculated upstream of the metering throttle of the combustion air admitted to the engine. During operating phases with a high EGR ratio, the quantity of exhaust gas between the exhaust gas recirculation valve and the gas throttle can be high.

When the driver stops accelerating by completely lifting his foot off the accelerator, the metering throttle closes almost completely in order to reduce the engine torque produced and to achieve engine braking. The recirculated exhaust gases in the circuit portion located downstream of the exhaust gas recirculation valve and upstream of the gas throttle can only be evacuated by being consumed by the engine. Since the quantity of air admitted to the engine is then very low, these recirculated exhaust gases are only evacuated very slowly. Consequently, a very large amount of recirculated exhaust gases may remain in the intake circuit when the engine enters idle control, even if the exhaust gas recirculation valve is completely closed. Under these operating conditions, combustion stability can be highly degraded by the presence of these unwanted exhaust gases.

These combustion instabilities can generate uncomfortable vibrations for the occupants of the vehicle and increase the quantity of pollutants emitted. The purpose of the invention is to overcome these drawbacks.

SUMMARY OF THE INVENTION

For this purpose, the invention proposes a device for reducing the combustion instabilities of a combustion engine, this device comprising:
- a combustion air intake circuit of the engine,
- a valve positioned on the combustion air intake circuit of the engine that is designed to regulate the flow rate of combustion gas admitted to the engine,
- an exhaust gas recirculation circuit that is connected to the intake circuit upstream of the valve regulating the flow rate of combustion air,
- characterized in that the device is arranged such that, at least when fuel injection to the engine is cut off, the valve is opened a minimum amount to eliminate the recirculated gases from the intake circuit.

Opening the valve regulating the flow rate of combustion air helps to increase the quantity of combustion air admitted to the engine during each admission phase. Elimination of the recirculated exhaust gases is accelerated and the risk of a high EGR ratio at the intake during the idle phase is reduced.

Preferably, a valve designed to regulate the flow rate of recirculated exhaust gases is arranged on the recirculation circuit, and the valve regulating the air flow rate is opened a minimum amount after the exhaust gas recirculation valve is closed.

The variations in the ratio of recirculated exhaust gases in the intake circuit are thus more gradual.

The recirculated gases are eliminated from the intake circuit when the concentration of EGR gases in the intake circuit drops below 2%. Indeed, the effect of the recirculated exhaust gases is negligible below this threshold.

Preferably, the minimum amount opened and the time that the valve regulating the air flow rate is kept open the minimum amount are predefined. The electronic control unit of the engine opens the valve according to preset parameters in the memory thereof.

According to one embodiment, the minimum amount opened is constant.

According to one embodiment, the time that the valve is kept open the minimum amount is constant. This simple solution minimizes the calculations required of the electronic control unit.

According to another embodiment, the minimum amount opened depends on an estimated EGR ratio in the intake circuit. The EGR ratio in the portion of the intake circuit between the output of the recirculation circuit and the valve can be estimated as described in patent application FR3009020. The minimum amount that the valve is opened increases proportionally as a function of the estimated EGR ratio, since a large quantity of gas needs to be eliminated.

Preferably, the EGR ratio in the intake circuit is estimated continuously. The minimum amount that the valve is opened can therefore be updated continuously to take account of the changing conditions.

According to one embodiment, the minimum amount opened is zero when the estimated EGR ratio in the intake circuit is less than a first predetermined minimum ratio T1. If the ratio of recirculated gases in the circuit is low, for example between 5% and 10%, there is no risk of creating combustion instabilities when the combustion phase is restarted. There is then no need to increase the amount that the valve is opened. Priority is then given to achieving significant engine braking.

Preferably, the minimum amount opened depends on the rotational speed of the engine. The position of the valve makes it possible to estimate the quantity admitted in each admission phase. The rotational speed of the engine also makes it possible to determine the flow rate admitted by the engine.

According to one embodiment, the minimum opening is maintained as long as the estimated EGR ratio in the intake circuit is greater than a second predetermined threshold T2. If the estimated EGR ratio drops below the predetermined threshold, the recirculated exhaust gases are assumed to be completely eliminated from the intake circuit. There is therefore no longer any need to keep the valve open more than the base amount. The additional amount opened to accelerate evacuation of the recirculated exhaust gases in the intake circuit can then be closed. This benefits engine braking. By estimating the EGR ratios in the intake circuit and stopping any additional opening when not necessary, the time during which additional opening is applied can be reduced to the amount strictly necessary.

For example, the minimum opening depends on a measured water temperature of the coolant of the engine. Combustion stability depends notably on the operating temperature of the engine. This operating temperature is correlated to the temperature of the coolant of the engine. If the engine is still cold and has not yet reached thermal equilibrium, combustion is less stable and the engine is more sensitive to the presence of recirculated exhaust gases in the intake circuit. In parallel to this, friction in the engine is greater in the cold, and consequently engine braking is affected less by the additional opening of the valve regulating the flow rate of combustion air. It is therefore beneficial to apply a greater additional opening than when the engine has reached thermal equilibrium conditions.

According to one embodiment, the minimum opening of the valve depends on the operating richness in the engine. Since the composition of the recirculated exhaust gases varies with the richness, the effect of these gases on combustion stability also varies with richness. As in the previous case, taking operating richness into account helps to adapt the minimum opening to operating conditions.

According to one embodiment, the exhaust gas recirculation circuit recirculates the exhaust gases between a point downstream of a turbine of a supercharging device and a point upstream of a compressor of the supercharging device. This architecture of the recirculation circuit for exhaust gases is commonly referred to as "low pressure".

According to a variant of the invention, the device for reducing combustion instabilities includes an actuator used to vary the control phasing of a camshaft of the engine, according to which the actuator is controlled, together with the opening of the valve, such as to increase the flow rate of combustion gas admitted to the engine. In addition to the minimum opening of the valve, it is possible to activate other accessories that also increase the quantity of combustion gas drawn by the engine for each admission phase. If the engine is fitted with one or more camshaft phasing units, these may be controlled such as to help fill the engine, i.e. to maximize the quantity drawn with each intake.

As a variant or complement, the device has an actuator that is used to vary the lifting amplitude of a valve of the engine, according to which the actuator is controlled, together with the opening of the valve, such as to increase the flow rate of combustion gas admitted to the engine. If the engine is fitted with a variable valve lifting system, this may be controlled to help fill the engine.

Preferably, the valve regulating the flow rate of combustion gas admitted to the engine is a rotary valve. This type of valve regulates the flow rate of the gas admitted to the engine precisely and quickly. The valve is controlled by the electronic control unit of the engine.

According to one embodiment, the valve regulating the flow rate of recirculated gases in the engine is a rotary valve. This type of valve ensures a high flow rate while creating few pressure drops.

Alternatively, the valve regulating the flow rate of recirculated gases in the engine is a poppet valve.

This type of valve provides low leak rate and good resistance to high gas temperatures.

According to one embodiment, the combustion engine is a spark ignition combustion engine.

According to one aspect of the invention, the combustion engine is a direct-injection combustion engine.

The invention also relates to a method for reducing the combustion instabilities of a combustion engine, comprising the following steps:
- supplying combustion air to the engine via an intake circuit, (step 50)
- regulating the flow rate of combustion gas admitted to the engine using a valve arranged on the intake circuit, (step 51)
- recirculating the exhaust gases between the exhaust and the intake of the engine, using a recirculation circuit connected to the intake circuit upstream of the valve, (step 52)
- at least while fuel injection is cut off, opening the valve a minimum amount in order to eliminate the recirculated exhaust gases from the intake circuit. (step 53)

BRIEF DESCRIPTION OF THE DRAWINGS

The invention can be better understood by studying the figures.

DETAILED DESCRIPTION OF THE PREFERRED EMBODIMENTS

Figure 1:
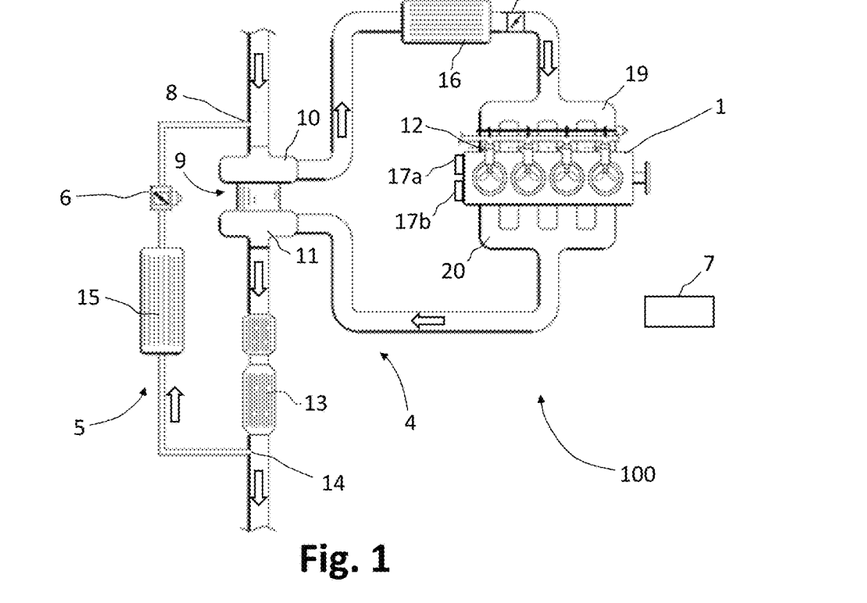
FIG. 1 is a schematic view of a combustion engine fitted with a device for reducing combustion instabilities as described.

FIG. 1 shows a combustion engine fitted with a device for reducing combustion instabilities of a combustion engine 1, said device comprising:
- a combustion air intake circuit 2 of the engine,
- a valve 3 positioned on the combustion air intake circuit of the engine that is designed to regulate the flow rate of combustion gas admitted to the engine,
- an exhaust gas recirculation circuit 5 that is connected to the intake circuit 2 upstream of the valve 3 regulating the flow rate of combustion air,
- characterized in that the device 100 is arranged such that, at least when fuel injection to the engine 1 is cut off, the valve 3 is opened a minimum amount to eliminate the recirculated gases from the intake circuit 2.

The combustion engine 1 is a spark ignition combustion engine.

The combustion engine 1 is also a direct-injection combustion engine.

The electronic control unit 7 receives signals from all of the sensors fitted to the engine 1 and controls all of the actuators in order to ensure the engine 1 works correctly.

The engine 1 is supplied with combustion air to the engine via an intake circuit 2. A regulating valve 3, also referred to as a throttle body, is used to regulate the flow rate of combustion air admitted to the engine 1. Combustion air means a mix containing air, recirculated exhaust gases and fuel vapors from the tank. The fuel, which is pressurized and delivered to each of the combustion chambers of the engine 1 by injectors 12, burns in each of the cylinders of the engine 1. This combustion generates the mechanical work supplied by the engine. After combustion, the burnt gases are evacuated via the exhaust circuit 4.

In the example shown, the engine is supercharged, i.e. the pressure of the intake air is raised above atmospheric pressure before admission to the engine 1. To do so, a supercharging device 9 includes a centrifugal compressor 10 driven in rotation by a turbine 11 that is traversed by the exhaust gases. The expansion of the exhaust gases in the turbine 11 provides enough energy to the compressor 10 to provide the compression work of the intake air. Supercharging, well known to the person skilled in the art, helps to increase the performance of an engine of equal cylinder capacity, or to provide the same performance with a lower cylinder capacity.

After expansion in the turbine 11, the exhaust gases pass through an anti-pollution device 13 that converts most of the gaseous pollutants and traps the solid particles. Downstream of this anti-pollution device 13 there is a tap 14 for the exhaust gas recirculation circuit 5. A portion of the exhaust gases is thus returned to the intake of the engine 1 after passing through the recirculation circuit 5. The recirculation circuit 5 is in this case connected to the intake circuit 2 upstream of the valve 3. In other words, the exhaust gas recirculation circuit 5 recirculates the exhaust gases between a point downstream of a turbine 11 of a supercharging device 9 and a point upstream of a compressor 10 of the supercharging device 9, forming a "low pressure" architecture.

The throttle body regulating the flow rate of combustion gas admitted to the engine 1 is a rotary valve. The angular position of a rotary shutter in the conduit enables the flow rate passing through the valve to be varied. The valve is controlled by the electronic control unit 7 of the engine in order to achieve the air flow rate required for the operating conditions dictated by the environment and by the driver.

The recirculation circuit 5 includes a heat exchanger 15 that is designed to cool the exhaust gases. The recirculation of exhaust gases makes it possible to reduce the combustion temperatures, which reduces the possibility of knocking in the engine and reduces the need to enrich the air-fuel mixture. These two effects help to improve the efficiency of the engine and therefore to reduce fuel consumption. Cooling of the recirculated exhaust gases helps to increase the efficiency thereof in reducing fuel consumption.

A valve 6 designed to regulate the flow rate of recirculated exhaust gases is arranged on the recirculation circuit 5. In the example shown, the valve 6 regulating the flow rate of recirculated gases in the engine 1 is a rotary valve.

According to an embodiment that is not shown, the valve 6 regulating the flow rate of recirculated gases in the engine 1 is a poppet valve.

The ratio of recirculated exhaust gases, also referred to as the EGR ratio, is discussed below. This ratio is defined as the ratio between the mass flow of recirculated exhaust gases and the total mass flow admitted to the engine, expressed as a percentage.

When exhaust gas recirculation is applied, the recirculated gases flow through all of the portion of the intake circuit 2 located downstream of the point 8. In steady conditions, the concentration of recirculated gases in this portion of the circuit is equal to the EGR ratio used by the engine. The EGR ratio depends on the characteristics of the engine and the operating conditions, and can reach 15% to 20% at the points where the engine torque is between half of the maximum value and the maximum value thereof. Such points correspond to operating conditions in which the driver wishes to achieve a marked acceleration of the vehicle.

When the driver stops accelerating by completely lifting his foot off the accelerator, the throttle closes almost completely in order to reduce the engine torque produced and to achieve engine braking. Fuel injection is cut off as long as the engine speed is high enough, in order to minimize fuel consumption and pollutant emissions. In other words, no fuel is injected during this deceleration phase. The recirculated exhaust gases in the circuit portion located downstream of the exhaust gas recirculation valve and upstream of the gas throttle can only be evacuated by being consumed by the engine. Since the quantity of air admitted to the engine is then very low, because the shutter of the throttle body is practically closed, these recirculated exhaust gases are only evacuated very slowly. As long as fuel injection is inhibited, there are no unwanted effects. When fuel injection is restarted, for example because the engine speed is close to the idle speed, a very large amount of recirculated exhaust gases may remain in the intake circuit, even if the exhaust gas recirculation valve is completely closed. Under these operating conditions, combustion stability can be considerably degraded by the presence of these unwanted exhaust gases.

These combustion instabilities generate uncomfortable vibrations for the occupants of the vehicle and increase the quantity of pollutants emitted, and as such it is desirable to eliminate same.

To do so, the device 100 is arranged such that, at least when fuel injection to the engine 1 is cut off, the valve 3 is opened a minimum amount to eliminate the recirculated gases from the intake circuit 2.

By increasing the opening of the throttle body 3, the quantity of combustion air consumed by the engine during the injection cut-off phase is increased, which increases the speed at which the exhaust gases in the intake circuit 2 are consumed. This accelerates elimination of the recirculated exhaust gases from the circuit 2.

The valve 3 regulating the air flow rate is opened a minimum amount after the exhaust gas recirculation valve 6 has been closed.

The recirculated gases are eliminated from the intake circuit 2 when the concentration of EGR gases in the intake circuit 2 drops below 2%. Indeed, the effect of the recirculated exhaust gases is negligible below this threshold, and same can be considered to be eliminated.

According to one embodiment, the minimum amount opened and the time that the valve 3 regulating the air flow rate is kept open the minimum amount are predefined. These two parameters are stored in the electronic control unit of the engine in the form of maps. These maps can depend on different parameters.

According to one embodiment, the minimum amount opened is constant.

According to another embodiment, the time that the valve 3 is kept open the minimum amount is constant.

In the example shown, the minimum amount opened depends on an estimated EGR ratio in the intake circuit 2. The EGR ratio in the portion of the intake circuit between the output of the recirculation circuit and the valve can be estimated as described in patent application FR3009020.

The flow rate through the valve 6 is determined on the basis of the pressure conditions on both sides of the valve 6, the temperature of the gases in the vicinity of the valve and the position of the valve. The total flow rate admitted to the engine can be determined on the basis of the pressure and of the temperature in the intake manifold 19 and of a filling model.

The control unit 7 uses these two pieces of information to calculate the exhaust gas concentration in the intake circuit 2 in real time. In other words, the EGR ratio in the intake circuit 2 is estimated continuously.

The minimum opening applied to the throttle body 3 is determined on the basis of this concentration, the rotational speed of the engine and the rate of change of the rotational speed of the engine.

The minimum amount opened increases proportionally as a function of the estimated concentration, since a large quantity of gas needs to be eliminated. This minimum amount that the valve is opened is therefore updated continuously and takes account of the changing engine conditions.

The minimum amount opened is zero when the estimated EGR ratio in the intake circuit 2 is less than a first predetermined minimum ratio T1. This minimum ratio depends on the application in question and is usually close to 6%. In other words, the device for reducing combustion instabilities is inactive when the ratio of recirculated gases in the circuit is sufficiently low for there to be no risk of combustion instabilities occurring when the combustion phase restarts. This helps to achieve strong engine braking.

The minimum amount opened depends on the rotational speed of the engine 1. The position of the valve makes it possible to estimate the quantity admitted in each admission phase. The rotational speed of the engine also makes it possible to determine the flow rate admitted by the engine.

The minimum opening is maintained as long as the estimated EGR ratio in the intake circuit 2 is greater than a second predetermined threshold T2. This ratio also depends on the application in question and is usually 3%. If the estimated EGR ratio drops below the predetermined threshold, the recirculated exhaust gases are assumed to be completely eliminated from the intake circuit. There is therefore no longer any need to keep the valve open more than the base amount. In other words, the time that the minimum opening is maintained is automatically adjusted by the control unit 7 and can be reduced to the time strictly necessary to benefit engine braking.

Figure 2:
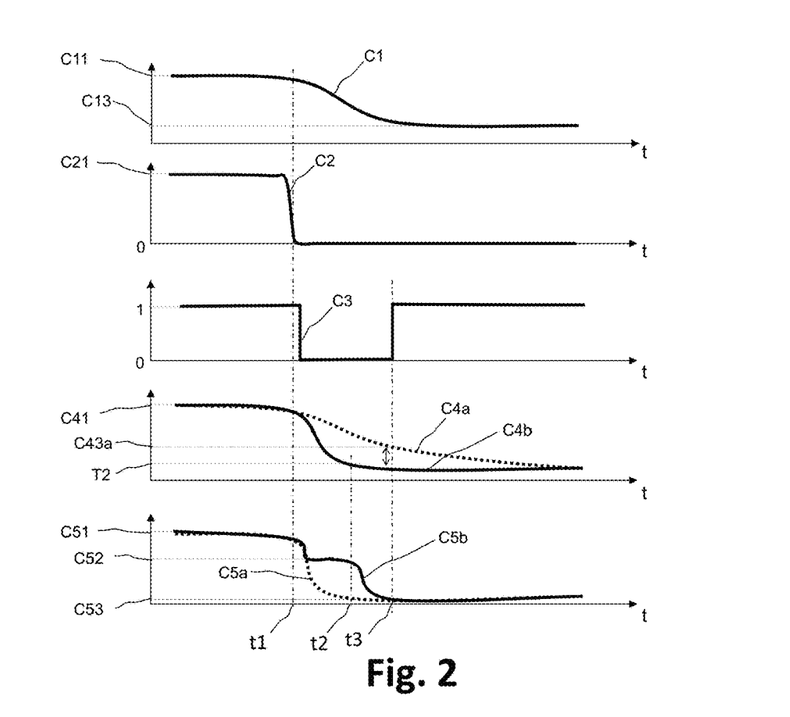
FIG. 2 shows schematically the temporal evolution of different operating parameters of the engine.

FIG. 2 shows the general operation of the device for reducing combustion instabilities.

The curve C1 shows the evolution of the rotational speed of the engine as a function of time.

The curve C2 shows the evolution of the position of the accelerator pedal as a function of time. The value 0 corresponds to the foot-raised position, and the value C21 corresponds to a position enabling the steady speed relating to the example.

The curve C3 shows activation and deactivation of injection over time. When curve C3 is in state 1, fuel injection is activated in each engine cycle. When curve C3 is in state 0, fuel injection is cut off and no fuel is injected.

The curves C4a and C4b show the evolution of the EGR ratio in the intake circuit as a function of time. The curve C4a, shown using a dotted line, shows this evolution when the device for reducing combustion instabilities is deactivated. The curve C4b, shown using an unbroken line, shows this evolution when the device for reducing instabilities is activated.

The curves C5a and C5b show the evolution of the position of the throttle 3 as a function of time. The curve C5a, shown using a dotted line, shows this evolution when the device for reducing combustion instabilities is deactivated. The curve C5b, shown using an unbroken line, shows this evolution when the device for reducing instabilities is activated.

The curves C1 and C2 show that, once steady speed is reached, the driver stops accelerating and releases the accelerator pedal. At instant $t_1$, the accelerator pedal is completely released and the engine speed starts dropping. A few milliseconds after $t_1$, fuel injection is cut off, as can be seen in curve C3.

While the device for reducing combustion instabilities is not activated, the curve C5a shows how the opening of the throttle 3 is reduced and the throttle is practically closed once the accelerator pedal is released. The curve C4a shows the drop in the EGR ratio in the intake circuit 2. As shown, at instant $t_3$, which is when injection restarts to activate idle control, the EGR ratio is still the value C43a.

While the device 100 for reducing combustion instabilities is activated, the curve C5b shows how the throttle 3 is opened a minimum amount, equal to the value C52. Consequently, the drop in the EGR ratio in the intake circuit is more rapid, as can be seen in the curve C4b. At instant $t_3$, the residual EGR ratio is lower than the value C43a, the arrow in FIG. 2 showing this difference.

At instant $t_2$, the EGR ratio drops beneath the threshold T2, the throttle 3 no longer needs to be opened a minimum amount, and said opening is gradually eliminated.

According to one embodiment, the minimum amount opened depends on a measured water temperature of the coolant of the engine 1. This measurement of the temperature of the coolant enables the operating temperature to be estimated. If the engine is still cold and has not yet reached thermal equilibrium, combustion is less stable and the engine is more sensitive to the presence of recirculated exhaust gases in the intake circuit. In parallel to this, friction between the different moving parts of the engine is greater than when hot, and consequently engine braking is affected less by the additional opening of the valve regulating the flow rate of combustion air. The additional opening of the throttle 3 can be higher than when the engine is in steady thermal conditions.

According to one embodiment, the minimum amount that the valve is opened depends on the operating richness in the engine 1. Since the composition of the recirculated exhaust gases varies with the richness, the effect of these gases on combustion stability also varies with richness. The operating richness is determined on the basis of information from a measurement probe placed in the exhaust (not shown). As before, the minimum opening of the throttle 3 is adapted to the operating conditions.

Other engine actuators can be used to enhance the effect obtained by the minimum opening of the throttle 3.

Thus, the device for reducing combustion instabilities includes an actuator 17a, 17b used to vary the control phasing of a camshaft of the engine, and the actuator 17a, 17b is controlled, together with the opening of the valve 3, such as to increase the flow rate of combustion gas admitted to the engine.

As a variant or complement, the device has an actuator 17a, 17b that is used to vary a lifting amplitude of the valve of the engine, and the actuator 17a, 17b is controlled, together with the opening of the valve 3, such as to increase a flow rate of combustion gas admitted to the engine. As for the camshaft phasing unit, the variable valve lifting system can be used in addition to the minimum opening of the throttle 3.

Figure 3:
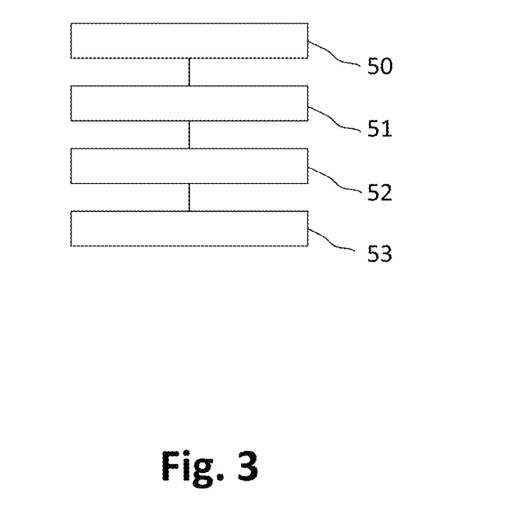
FIG. 3 is a block diagram showing the different steps of the method implemented by the device in FIG. 1.

The invention also relates to a method for reducing the combustion instabilities of a combustion engine 1. The method is shown as a block diagram in FIG. 3 and includes the following steps:
  supplying combustion air to the engine via an intake circuit 2 (step 50), regulating the flow rate of combustion gas admitted to the engine 1 using a valve 3 arranged on the intake circuit 2 (step 51), recirculating the exhaust gases between the exhaust and the intake of the engine, using a recirculation circuit connected to the intake circuit (step 52), at least while fuel injection is cut oft opening the valve a minimum amount in order to eliminate the recirculated exhaust gases from the intake circuit (step 53).

The invention claimed is:

1. A device (100) for reducing combustion instabilities of a combustion engine (1), the device comprising:
   a combustion air intake circuit (2) of the engine;
   a valve (3) positioned on the combustion air intake circuit of the engine that is configured to regulate a flow rate of combustion gas admitted to the engine; and
   an exhaust gas recirculation circuit (5) that is connected to the intake circuit (2) upstream of the valve (3) regulating the flow rate of combustion gas,
   wherein the device (100) is configured such that, at least when fuel injection to the engine (1) is cut off, the valve (3) is opened a minimum amount to eliminate recirculated gases from the intake circuit (2), and
   wherein the minimum amount opened is zero when an estimated EGR ratio in the intake circuit (2) is less than a predetermined minimum ratio (T1), said minimum amount opened also dependent on a rotational speed of the engine (1).

2. The device as claimed in claim 1, further comprising:
   an exhaust gas recirculation valve (6) that is arranged on the recirculation circuit (5) and configured to regulate a flow rate of recirculated exhaust gases,
   wherein the valve (3) regulating the flow rate of combustion gas is opened the minimum amount after the exhaust gas recirculation valve (6) is closed.

3. The device as claimed in claim 1, wherein an amount of time that the valve (3) regulating the flow rate of combustion gas is kept open the minimum amount is predefined.

4. The device as claimed in claim 1, wherein the EGR ratio in the intake circuit (2) is estimated continuously.

5. The device as claimed in claim 1, wherein the exhaust gas recirculation circuit (5) recirculates the exhaust gases between a point downstream of a turbine (11) of a supercharging device (9) and a point upstream of a compressor (10) of the supercharging device (9).

6. The device as claimed in claim 1, wherein the combustion engine (1) is a spark ignition combustion engine.

7. The device as claimed in claim 2, wherein an amount of time that the valve (3) regulating the flow rate of combustion gas is kept open the minimum amount is predefined.

8. The device as claimed in claim 4, wherein the minimum opening is maintained as long as the estimated EGR ratio in the intake circuit (2) is greater than a second predetermined threshold (T2).

9. The device as claimed in claim 2, wherein the exhaust gas recirculation circuit (5) recirculates the exhaust gases between a point downstream of a turbine (11) of a supercharging device (9) and a point upstream of a compressor (10) of the supercharging device (9).

10. The device as claimed in claim 3, wherein the exhaust gas recirculation circuit (5) recirculates the exhaust gases between a point downstream of a turbine (11) of a supercharging device (9) and a point upstream of a compressor (10) of the supercharging device (9).

11. The device as claimed in claim 4, wherein the exhaust gas recirculation circuit (5) recirculates the exhaust gases between a point downstream of a turbine (11) of a supercharging device (9) and a point upstream of a compressor (10) of the supercharging device (9).

12. A device (100) for reducing combustion instabilities of a combustion engine (1), comprising:
    a combustion air intake circuit (2) of the engine;
    a valve (3) positioned on the combustion air intake circuit of the engine that is configured to regulate a flow rate of combustion gas admitted to the engine; and
    an exhaust gas recirculation circuit (5) that is connected to the intake circuit (2) upstream of the valve (3) regulating the flow rate of combustion gas,
    wherein the device (100) is configured such that, at least when fuel injection to the engine (1) is cut off, the valve (3) is opened a minimum amount to eliminate recirculated gases from the intake circuit (2), and
    wherein the minimum opening is maintained as long as an estimated EGR ratio in the intake circuit (2) is greater than a predetermined threshold (T2) said minimum amount opened also dependent on a rotational speed of the engine (1).

13. A method for reducing combustion instabilities of a combustion engine (1), comprising the following steps:
    supplying combustion gas to the engine via an intake circuit (2);
    regulating a flow rate of the combustion gas admitted to the engine (1) using a valve (3) arranged on the intake circuit (2);
    recirculating exhaust gases between an exhaust and an intake of the engine, using a recirculation circuit connected to the intake circuit upstream of the valve (3); and
    at least while fuel injection is cut off, opening the valve a minimum amount in order to eliminate the recirculated exhaust gases from the intake circuit,
    wherein the minimum amount opened is zero when the estimated EGR ratio in the intake circuit (2) is less than a first predetermined minimum ratio (T1), said minimum amount opened also dependent on a rotational speed of the engine (1).

14. A method for reducing combustion instabilities of a combustion engine (1), comprising the following steps:
    supplying combustion gas to the engine via an intake circuit (2);
    regulating a flow rate of the combustion gas admitted to the engine (1) using a valve (3) arranged on the intake circuit (2);
    recirculating exhaust gases between an exhaust and an intake of the engine, using a recirculation circuit connected to the intake circuit upstream of the valve (3); and
    at least while fuel injection is cut off, opening the valve a minimum amount in order to eliminate the recirculated exhaust gases from the intake circuit,
    wherein the minimum opening is maintained as long as an estimated EGR ratio in the intake circuit (2) is greater than a predetermined threshold (T2), said minimum amount opened also dependent on a rotational speed of the engine (1).

15. A device (100) for reducing combustion instabilities of a combustion engine (1), the device comprising:
    a combustion air intake circuit (2) of the engine;
    a valve (3) positioned on the combustion air intake circuit of the engine that is configured to regulate a flow rate of combustion gas admitted to the engine; and an exhaust gas recirculation circuit (5) that is connected to the intake circuit (2) upstream of the valve (3) regulating the flow rate of combustion gas, wherein the device (100) is configured such that, at least when fuel injection to the engine (1) is cut off, the valve (3) is opened a minimum amount to eliminate recirculated gases from the intake circuit (2), and wherein the minimum amount opened is zero when an estimated EGR ratio in the intake circuit (2) is less than a predetermined minimum ratio (T1), said minimum amount opened also dependent on a measured water temperature of a coolant of the engine (1).

16. The device as claimed in claim 15, further comprising:
an exhaust gas recirculation valve (6) that is arranged on the recirculation circuit (5) and configured to regulate a flow rate of recirculated exhaust gases, wherein the valve (3) regulating the flow rate of combustion gas is opened the minimum amount after the exhaust gas recirculation valve (6) is closed.

17. The device as claimed in claim 15, wherein an amount of time that the valve (3) regulating the flow rate of combustion gas is kept open the minimum amount is predefined.

18. The device as claimed in claim 15, wherein the EGR ratio in the intake circuit (2) is estimated continuously.

19. The device as claimed in claim 15, wherein the exhaust gas recirculation circuit (5) recirculates the exhaust gases between a point downstream of a turbine (11) of a supercharging device (9) and a point upstream of a compressor (10) of the supercharging device (9).

20. The device as claimed in claim 15, wherein the combustion engine (1) is a spark ignition combustion engine.

21. The device as claimed in claim 6, wherein an amount of time that the valve (3) regulating the flow rate of combustion gas is kept open the minimum amount is predefined.

22. The device as claimed in claim 18, wherein the minimum opening is maintained as long as the estimated EGR ratio in the intake circuit (2) is greater than a second predetermined threshold (T2).

23. The device as claimed in claim 16, wherein the exhaust gas recirculation circuit (5) recirculates the exhaust gases between a point downstream of a turbine (11) of a supercharging device (9) and a point upstream of a compressor (10) of the supercharging device (9).

24. The device as claimed in claim 17, wherein the exhaust gas recirculation circuit (5) recirculates the exhaust gases between a point downstream of a turbine (11) of a supercharging device (9) and a point upstream of a compressor (10) of the supercharging device (9).

25. The device as claimed in claim 18, wherein the exhaust gas recirculation circuit (5) recirculates the exhaust gases between a point downstream of a turbine (11) of a supercharging device (9) and a point upstream of a compressor (10) of the supercharging device (9).

26. A device (100) for reducing combustion instabilities of a combustion engine (1), comprising:
a combustion air intake circuit (2) of the engine;
a valve (3) positioned on the combustion air intake circuit of the engine that is configured to regulate a flow rate of combustion gas admitted to the engine; and
an exhaust gas recirculation circuit (5) that is connected to the intake circuit (2) upstream of the valve (3) regulating the flow rate of combustion gas,
wherein the device (100) is configured such that, at least when fuel injection to the engine (1) is cut off, the valve (3) is opened a minimum amount to eliminate recirculated gases from the intake circuit (2), and
wherein the minimum opening is maintained as long as an estimated EGR ratio in the intake circuit (2) is greater than a predetermined threshold (T2), said minimum amount opened also dependent on a measured water temperature of a coolant of the engine (1).

27. A method for reducing combustion instabilities of a combustion engine (1), comprising the following steps:
supplying combustion gas to the engine via an intake circuit (2);
regulating a flow rate of the combustion gas admitted to the engine (1) using a valve (3) arranged on the intake circuit (2);
recirculating exhaust gases between an exhaust and an intake of the engine, using a recirculation circuit connected to the intake circuit upstream of the valve (3); and
at least while fuel injection is cut off, opening the valve a minimum amount in order to eliminate the recirculated exhaust gases from the intake circuit,
wherein the minimum amount opened is zero when the estimated EGR ratio in the intake circuit (2) is less than a first predetermined minimum ratio (T1), said minimum amount opened also dependent on a measured water temperature of a coolant of the engine (1).

28. A method for reducing combustion instabilities of a combustion engine (1), comprising the following steps:
supplying combustion gas to the engine via an intake circuit (2);
regulating a flow rate of the combustion gas admitted to the engine (1) using a valve (3) arranged on the intake circuit (2);
recirculating exhaust gases between an exhaust and an intake of the engine, using a recirculation circuit connected to the intake circuit upstream of the valve (3); and
at least while fuel injection is cut off, opening the valve a minimum amount in order to eliminate the recirculated exhaust gases from the intake circuit,
wherein the minimum opening is maintained as long as an estimated EGR ratio in the intake circuit (2) is greater than a predetermined threshold (T2), said minimum amount opened also dependent on a measured water temperature of a coolant of the engine (1).

29. A device (100) for reducing combustion instabilities of a combustion engine (1), the device comprising:
a combustion air intake circuit (2) of the engine;
a valve (3) positioned on the combustion air intake circuit of the engine that is configured to regulate a flow rate of combustion gas admitted to the engine; and
an exhaust gas recirculation circuit (5) that is connected to the intake circuit (2) upstream of the valve (3) regulating the flow rate of combustion gas,
wherein the device (100) is configured such that, at least when fuel injection to the engine (1) is cut off, the valve (3) is opened a minimum amount to eliminate recirculated gases from the intake circuit (2), and wherein the minimum amount opened is zero when an estimated EGR ratio in the intake circuit (2) is less than a predetermined minimum ratio (T1), said minimum amount opened also dependent on an operating richness in the engine (1).

30. The device as claimed in claim 29, further comprising:
an exhaust gas recirculation valve (6) that is arranged on the recirculation circuit (5) and configured to regulate a flow rate of recirculated exhaust gases, wherein the valve (3) regulating the flow rate of combustion gas is opened the minimum amount after the exhaust gas recirculation valve (6) is closed.

31. The device as claimed in claim 29, wherein an amount of time that the valve (3) regulating the flow rate of combustion gas is kept open the minimum amount is predefined.

32. The device as claimed in claim 29, wherein the EGR ratio in the intake circuit (2) is estimated continuously.

33. The device as claimed in claim 29, wherein the exhaust gas recirculation circuit (5) recirculates the exhaust gases between a point downstream of a turbine (11) of a supercharging device (9) and a point upstream of a compressor (10) of the supercharging device (9).

34. The device as claimed in claim 29, wherein the combustion engine (1) is a spark ignition combustion engine.

35. The device as claimed in claim 30, wherein an amount of time that the valve (3) regulating the flow rate of combustion gas is kept open the minimum amount is predefined.

36. The device as claimed in claim 32, wherein the minimum opening is maintained as long as the estimated EGR ratio in the intake circuit (2) is greater than a second predetermined threshold (T2).

37. The device as claimed in claim 30, wherein the exhaust gas recirculation circuit (5) recirculates the exhaust gases between a point downstream of a turbine (11) of a supercharging device (9) and a point upstream of a compressor (10) of the supercharging device (9).

38. The device as claimed in claim 31, wherein the exhaust gas recirculation circuit (5) recirculates the exhaust gases between a point downstream of a turbine (11) of a supercharging device (9) and a point upstream of a compressor (10) of the supercharging device (9).

39. The device as claimed in claim 32, wherein the exhaust gas recirculation circuit (5) recirculates the exhaust gases between a point downstream of a turbine (11) of a supercharging device (9) and a point upstream of a compressor (10) of the supercharging device (9).

40. A device (100) for reducing combustion instabilities of a combustion engine (1), comprising:
   a combustion air intake circuit (2) of the engine;
   a valve (3) positioned on the combustion air intake circuit of the engine that is configured to regulate a flow rate of combustion gas admitted to the engine; and
   an exhaust gas recirculation circuit (5) that is connected to the intake circuit (2) upstream of the valve (3) regulating the flow rate of combustion gas,
   wherein the device (100) is configured such that, at least when fuel injection to the engine (1) is cut off, the valve (3) is opened a minimum amount to eliminate recirculated gases from the intake circuit (2), and
   wherein the minimum opening is maintained as long as an estimated EGR ratio in the intake circuit (2) is greater than a predetermined threshold (T2), said minimum amount opened also dependent on an operating richness in the engine (1).

41. A method for reducing combustion instabilities of a combustion engine (1), comprising the following steps:
   supplying combustion gas to the engine via an intake circuit (2);
   regulating a flow rate of the combustion gas admitted to the engine (1) using a valve (3) arranged on the intake circuit (2);
   recirculating exhaust gases between an exhaust and an intake of the engine, using a recirculation circuit connected to the intake circuit upstream of the valve (3); and
   at least while fuel injection is cut off, opening the valve a minimum amount in order to eliminate the recirculated exhaust gases from the intake circuit,
   wherein the minimum amount opened is zero when the estimated EGR ratio in the intake circuit (2) is less than a first predetermined minimum ratio (T1), said minimum amount opened also dependent on an operating richness in the engine (1).

42. A method for reducing combustion instabilities of a combustion engine (1), comprising the following steps:
   supplying combustion gas to the engine via an intake circuit (2);
   regulating a flow rate of the combustion gas admitted to the engine (1) using a valve (3) arranged on the intake circuit (2);
   recirculating exhaust gases between an exhaust and an intake of the engine, using a recirculation circuit connected to the intake circuit upstream of the valve (3); and
   at least while fuel injection is cut off, opening the valve a minimum amount in order to eliminate the recirculated exhaust gases from the intake circuit, wherein the minimum opening is maintained as long as an estimated EGR ratio in the intake circuit (2) is greater than a predetermined threshold (T2), said minimum amount opened also dependent on an operating richness in the engine (1).

* * * * *